(12) United States Patent
Ganesan

(10) Patent No.: US 7,945,774 B2
(45) Date of Patent: May 17, 2011

(54) EFFICIENT SECURITY FOR MASHUPS

(75) Inventor: Ravi Ganesan, Half Moon Bay, CA (US)

(73) Assignee: Safemashups Inc., San Antonio, TX (US)

( * ) Notice: Subject to any disclaimer, the term of this patent is extended or adjusted under 35 U.S.C. 154(b) by 614 days.

(21) Appl. No.: 12/098,803

(22) Filed: Apr. 7, 2008

(65) Prior Publication Data

US 2009/0254745 A1   Oct. 8, 2009

(51) Int. Cl.
*H04L 9/00* (2006.01)
*G06F 7/04* (2006.01)
*G06F 17/30* (2006.01)

(52) U.S. Cl. ........ 713/151; 713/169; 713/170; 713/171; 713/172; 713/174; 726/27; 726/28; 726/29; 726/30

(58) Field of Classification Search .................... 713/151
See application file for complete search history.

(56) References Cited

U.S. PATENT DOCUMENTS

| | | | |
|---|---|---|---|
| 5,315,658 A | 5/1994 | Micali | |
| 5,657,390 A | 8/1997 | Elgamal et al. | |
| 6,141,750 A | 10/2000 | Micali | |
| 6,212,635 B1 | 4/2001 | Reardon | |
| 6,367,009 B1 | 4/2002 | Davis et al. | |
| 7,020,688 B2 | 3/2006 | Sykes, Jr. | |
| 7,318,238 B2 | 1/2008 | Elvanoglu et al. | |
| 7,651,677 B1 * | 1/2010 | Strohmaier et al. | 423/706 |
| 2003/0140226 A1 | 7/2003 | Yamamoto et al. | |
| 2003/0182423 A1 | 9/2003 | Shafir et al. | |
| 2004/0103283 A1 | 5/2004 | Hornak | |
| 2005/0086197 A1 | 4/2005 | Boubez et al. | |
| 2006/0080352 A1 | 4/2006 | Boubez et al. | |
| 2007/0289006 A1 | 12/2007 | Ramachandran et al. | |
| 2008/0046984 A1 | 2/2008 | Bohmer et al. | |

OTHER PUBLICATIONS

Collin Jackson "Subspace secured Cross-Domain Token"—2007.*
"Internet RFC 2246 The Transport Level Security (TLS) Protocol" http://www.ietf.org/rfc/rfc2246.txt (Jan 1999).
The Anti Phishing Working Group, http://www.antiphishing.org.
The Design and Implementation of Datagram TLS, N. Modadugu and E. Rescorla. http://crypto.stanford.edu/~nagendra/papers/dtls.pdf.
Google Account Authentication API. http://code.google.com/apis/accounts/.
BBauth. Yahoo! Browser Based Authentication. http://developer.yahoo.com/auth/.
SSL-over-SOAP: Towards a Token-based Key Establishment Framework for Web Services, Sebastian Gajek, Lijun Liao, Bodo Möller and Jörg Schwenk, IEEE ECOWS Workshop on Emerging Web Services Technology (WEWST'07), Halle (Germany), 2007.
OAuth: An open protocol to allow secure API authentication in a simple and standard method from desktop and web applications. http://oauth.net/.

* cited by examiner

*Primary Examiner* — Longbit Chai
(74) *Attorney, Agent, or Firm* — Sughrue Mion, PLLC; David P. Emery

(57) ABSTRACT

The present invention provides a method that facilitates secure cross domain mashups in an efficient fashion. The invention allows a first entity, the Masher, to establish at a second entity, the User, a secure mashup by obtaining information from, or taking actions at, a third entity, the Mashee, by using a novel twist to the SSL protocol. The invention is further extended to secure a hub and widget architecture, which allows one Masher to establish at a User, communication with several Mashees. Mutual authentication of all entities, key distribution for authentication, privacy and code verification and dynamic authorization based on the certificate information are provided by the invention.

16 Claims, 15 Drawing Sheets

Server Side Mashup: This model can work in three ways (a) no user credentials needed at SITES B, C, D and E (b) User gives up credentials to other sites to Site A (c) some form of delegated authentication.

SSL

- Set-Up: Two web servers with regular SSL certificates.

- Handshake:

- At end of handshake both servers are mutually authenticated.
- All further communication after handshake is encrypted with secret.

Server Side Mashup: This model can work in three ways (a) no user credentials needed at SITES B, C, D and E (b) User gives up credentials to other sites to Site A (c) some form of delegated authentication.

Extended Mashup: Desktop loads content from SITE-A that accesses resource from Site B, Site C and Site D and presents consolidated data.

One model of mashing using widgets. The cross domain communication is in a sense abstracted into the problem of how the widgets communicate.

Another conceptual model where the 'masher' first loads a 'hub' (e.g. The OpenAJAX specification) which loads widgets and enables their communication.

FIGURE 10

```
MashSSL-Handshake-XML1
<?xml version="1.0" encoding="UTF-8"?>
<mashssl-handshake-1 version = "1.0">

<ssl-handshake-1-client-hello>
                <ssl-session-id>
                <random>
                        <gmt-unix-time>
                        <ssl-client-hello-random> //May be scrambled
                </random>
                <ciphersuites>
                </ciphersuites>
                <compression-list>
                </compression-list>
        </ssl-handshake-1-client-hello>

<mashssl-additions-1>
                <mashssl-principals>
                        <mashssl-user-id> //unique to this user
                        <mashssl-client-name>
                        <mashssl-server-name>
                </mashssl-principals>
                <mashssl-user-client-random> //also scrambled; used to derive
mashssl-user-client-key//
                        <client-certificate> //May be different from the SSL certificate
                        <scramble-options>
                                <scrambling-on> //TRUE or FALSE
                                <high-entropy-scrambling-key> //TRUE or FALSE
                                <authentication-information> //PASSWORD, OTP, OOB, PKI,
SC
                                <using-cached-key-at-user> //TRUE or FALSE
                        </scramble-options>
                        <scramble-options-requested-of-other-server>
                                <request-scrambling-on>    //MUST-HAVE,    PREFERRED,
DONT-CARE
                                <request-high-entropy-user-key>//MUST-HAVE,
PREFERRED, DONT-CARE
                                <request-authentication-information>//ordered list
                                <request-using-cached-key-at-user>//MUST-HAVE,
PREFERRED, DONT-CARE
                        </scramble-options-requested-of-other-server>
                </mashssl-additions-1>
</mashssl-handshake-1>
```

FIGURE 11

MashSSL-Message-2
<?xml version="1.0" encoding="UTF-8"?>
<mashssl-handshake-2 version = "1.0">

<ssl-handshake-2-server-hello>
        <ssl-session-id> //Fresh session-id, unless reusing existing parameters //
        <random>
            <gmt-unix-time>
            <ssl-serverhello-random> //Tag, or tag/value scrambled, if scrambling is on //
        </random>
        <ciphersuite>
        <compression-choice>
        <server-certificate>
        <certificate-request>
    </ssl-handshake-2-server-hello>

<mashssl-additions-2>
        <mashssl-principals>
            <mashssl-user-id>
            <mashssl-client-name>
            <mashssl-server-name>
        </mashssl-principals>
        <server-certificate>
        <mashssl-low-entropy-scrambling-verify> //e.g. Validation of correct password entry//
        <mashssl-user-server-random> //used to derive mashssl-user-server-key//
        <scramble-options>
            <scrambling-on> //TRUE or FALSE //
            <high-entropy-scrambling-key> //TRUE or FALSE//
            <authentication-information> //PASSWORD, OTP, OOB, PKI, SC //
            <using-cached-key-at-user> //TRUE or FALSE //
        </scramble-options>
    </mashssl-additions-1>

</mash-ssl-handshake-2>

FIGURE 12

MashSSL-Handshake-3XML
<?xml version="1.0" encoding="UTF-8"?>
<mashssl-handshake-3 version = "1.0">

<ssl-handshake-3-client-key-exchange>
        <ssl-session-id>
        <client-certificate>
        <client-key-exchange> //pre-master-secret encrypted with server public key//
        <certificate-verify> //rhash signed with client private key //
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with mashssl-user-client-key//
        <mashssl-data-for server> //data encrypted with master-secret//

</mashssl-additions-3>

</ mashssl-handshake-3>

FIGURE 13

MashSSL-Handshake-XML4
<?xml version="1.0" encoding="UTF-8"?>
<mashssl-handshake-4 version = "1.0">

<ssl-handshake-4-server-finished>
        <ssl-session-id>
        <Finished>
    </ssl-handshake-4-server-finished>

<mashssl-additions-4>
        <mashssl-principals>
            <mashssl-user-id>
            <mashssl-client-name>
            <mashssl-server-name>
        </mashssl-principals>
        <mashssl-data-for-user>  //data encrypted with mashssl-user-server-key//
        <mashssl-data-for client>  //data encrypted with master-secret//

<general-parameters>
            <cross-domain-authorization-token>
            <cross-domain-client-server-key>
            <cross-domain-client -server_widget-key>
            <cross-domain-client_widget-server-key>
            <cross-domain-widget-widget-key>
        </mashssl-data-for client>
    </mashssl-additions-4>

</ mashssl-handshake-4>

FIGURE 14

MashSSL-Handshake-XML2abbreviated
```xml
<?xml version="1.0" encoding="UTF-8"?>
<mashssl-handshake-2abbreviated version = "1.0">

<ssl-handshake-2-server-hello>
                <ssl-session-id> //Same session-id as in ssl-handshake-1-client-hello //
                <random>
                        <gmt-unix-time>
                        <ssl-serverhello-random>
                </random>
                <Finished>
        </ssl-handshake-2-server-hello>

<mashssl-additions-2>
                <mashssl-principals>
                        <mashssl-user-id>
                        <mashssl-client-name>
                        <mashssl-server-name>
                </mashssl-principals>
                <server-certificate>
                <mashssl-user-server-random>  //used to derive mashssl-user-server-key//
                <mashssl-low-entropy-scrambling-verify>   //e.g. Validation of correct password
                <scramble-options>
                        <scrambling-on> //TRUE or FALSE //
                        <high-entropy-scrambling-key> //TRUE or FALSE//
                        <authentication-information> //PASSWORD, OTP, OOB, PKI, SC //
                        <using-cached-key-at-user> //TRUE or FALSE //
                </scramble-options>
                <mashssl-data-for-user>  //data encrypted with mashssl-user-server-key//
                <mashssl-data-for-client> //data encrypted with master-secret//
        </mashssl-additions-1>

</mash-ssl-handshake-2abbreviated>
```

FIGURE 15

MashSSL-Handshake-XML3abbreviated
<?xml version="1.0" encoding="UTF-8"?>
<mashssl-handshake-3abbreviated version = "1.0">

<ssl-handshake-3-client-key-exchange>
        <ssl-session-id>
        <Finished>
    </ssl-handshake-3-client-key-exchange>

<mashssl-additions-3>
        <mashssl-principals>
            <mashssl-user-id>
            <mashssl-client-name>
            <mashssl-server-name>
        </mashssl-principals>
        <mashssl-data-for-user> //data encrypted with mashssl-user-client-key//
        <mashssl-data-for server> //data encrypted with master-secret//
    </mashssl-additions-3>

</ mashssl-handshake-3abbreviated> ered to as HTTPS for brevity).

EFFICIENT SECURITY FOR MASHUPS

TECHNICAL FIELD

This invention relates to cryptography. More particularly it relates to cryptography in the areas of cross domain authorization and mashups.

BACKGROUND OF THE INVENTION

Authentication and Man in the Middle Phishing

Many authentication techniques exist which allow an entity (e.g. a user or a web server) to prove its identity to another entity. Often these systems are based on the existence of a shared secret. For instance, revealing knowledge of a shared password is a very common method. Or, one can have 'one time passwords' which are generated based on a shared secret, with both parties having the ability to compute the one time password.

Some systems do not rely on shared secrets, and instead use a technique called public-key cryptography. Here the user proves knowledge of a secret, for instance, by using it to sign a message, but does not reveal the secret itself. The signature is typically verified using information that is unique to the user, but is public. Public key cryptography is typically implemented using a technology called digital certificates. In general, systems based on public key cryptography are considered more secure, but are not as widely used because they are cumbersome (especially for human users; as opposed to computer servers).

Almost all these techniques are vulnerable to the insertion of an attacker in between the legitimate parties. Such an attack is known as a man in the middle (MITM) attack. This has led to the widespread incidence of so-called phishing attacks. Two types of phishing attacks exist, off line and real time. In the off-line case, the MITM simply fools the user into giving up their secret, and at a later time, can enter the password into the legitimate web site. In the on-line case, the man in the middle attacker ferries traffic back and forth in real time. In this case even if the secret is short lived, e.g. a hardware token with a secret number that changes every thirty seconds, the session can be phished. Both such attacks have been widely observed in practice.

It is important to note that the use of stronger techniques like public key cryptography by themselves do not guarantee protection against a man in the middle. Consider a simple example. Assume the web server requires the user to use public key cryptography to sign a fresh challenge in order to authenticate. In this case a real time MITM could simply get the challenge from the web server, transmit that challenge to the user, who will sign it and return it to the MITM, who returns it the legitimate web server. The web server is satisfied and will let the MITM access the system! While this simple use of public key cryptography is easily seen to be insecure, more secure protocols exist which prevent MITMs. For instance the Secure Sockets Layer (SSL) protocol when used with mutual authentication (defined later), can thwart a MITM attacker. While SSL is very widely used, it is rarely used with mutual authentication.

The Secure Sockets Layer Protocol

The SSL protocol (which has been renamed the Transport Layer Security or TLS protocol) is one of the most widely used security protocols on the Internet. As is evident from the name it has been designed to be a two entity protocol most generally used to secure "sockets" (or more generally the "transport layer" in a communication protocol). For instance, on the Internet, which uses TCP/IP, SSL is used to take a "TCP socket" between two entities and make it a "secure socket". Once such a "secure socket" has been established, application level protocols like HTTP can be run between the two entities over the secure socket (HTTP over SSL is at times referred to as HTTPS for brevity).

Note that while SSL is described as an end to end protocol, the actual packets carrying the SSL traffic might go through many intermediate hops. e.g. in the classic case where TCP/IP is used as the transport the IP packets might traverse many different nodes. However, the intermediate nodes play no part in processing the SSL messages, and for them it is simply data being transported. Similarly, others have proposed or implemented SSL as a two entity protocol used over wireless, used over datagram services, used over the SOAP standard, etc. All these variations of SSL do not change the fundamental two entity end to end authentication and key exchange purpose of SSL, and the presence of intermediate points play no role in the processing of SSL. This work has no bearing on our invention, which will introduce an active man in the middle necessary for correct protocol functioning.

There have also been numerous implementations of what are sometimes referred to as 'SSL proxies'. Here there is a proxy or gateway between the end points. However, there is no longer one SSL connection between the end points. Rather, there is a SSL connection from one end point to the gateway, and then another SSL connection between the gateway and the other end point. This also has no bearing on our work, which is focussed on a single SSL session with end to end security.

SSL can be used to perform three functions to secure a connection between Entity 1 and Entity 2:

1. Entity 1 (often a user at a browser) can authenticate Entity 2 (often a web service), if Entity 2 has a trusted digital certificate.
2. Provide for encrypted communication between Entity 1 and Entity 2.
3. Can optionally be used to authenticate Entity 1 to Entity 2 (mutual authentication), if Entity 1 has a trusted digital certificate.

In general when Entity 1 is a user at a browser, and Entity 2 is a web server, then only the first two steps are used. As an example, any user can visit the USPTO at https://sas.uspto.gov/ptosas/ and set up a HTTP over SSL connection. However, at that point, while the user has authenticated the USPTO web site (and has an encrypted session), the USPTO has not authenticated the user. For this to happen the user would need a digital certificate.

In practice it is easy for organizations/servers to possess digital certificates. For instance in the example above, the USPTO could have purchased the digital certificate it uses to secure its web site for literally less than ten dollars and have set it up in a few minutes. On the other hand, it has proven very difficult for individual users to obtain, carry and use certificates. As an example, the USPTO has a program to issuer customers with certificates. (see https://sas.uspto.gov/enroll/traditional-client-zf-create.html), and it can be easily seen that giving users certificates and managing them on an ongoing fashion is difficult and costly.

For these reasons, SSL is typically used to authenticate a web site (e.g. USPTO) to a user's browser, but not typically the other way around. The exception to this would be when SSL is used to secure server to server communication. As it is simple for both servers to be set up with digital certificates, in such cases SSL is often used with mutual authentication.

SSL works in two steps, first Entity 1 and Entity 2 perform a 'handshake' in the course of which the authentication and the key exchange for encryption are performed, and a variety of other parameters are exchanged. Once the 'handshake' is complete the two parties can communicate securely using a shared master_secret. As it is relevant to our future discussion, we will describe the SSL handshake (with mutual authentication). Our description is meant to convey the essence of the protocol, and is not meant to be a detailed description for which we refer the reader to the Internet standard.

FIG. 1 shows the standard SSL handshake. To begin with, it is assumed that both entities (referred to as Server 1 and Server 2 for convenience) have digital certificates issued by authorities the other party trusts. The protocol begins with a handshake mechanism which consists of four message exchanges:

SSL-Handshake-1 (aka CLIENT-HELLO) Server 1 sends a message to Server2 which among other things contains a random number, which we call R1. [R1]

SSL-Handshake-2 (aka SERVER-HELLO) Server 2 replies with another random number R2, its own digital certificate, and a request for mutual authentication (somewhat misleadingly called the Certificate-Request). [R2, Cert2, Request Cert1]

SSL-Handshake-3 (aka CLIENT-KEY-EXCHANGE) Server 1 verifies the authenticity of Server 2's certificate, and in the process extracts Server 2's public key. It then encrypts a third random number which we call R3 with this public key. It further signs a running_hash of all messages exchanged up to that point with its own private key. Server 1 then sends the encrypted R3, the signed running hash, and its own certificate to Server 2. [encrypt(R3,Cert2),Sign(running_hash,Cert1), Cert1]. Server 1 also combines R1, R2 and R3 to create a master_secret.

SSL-Handshake-4 (SERVER-FINISHED) On receiving the above message, Server 2 uses its own private key to recover R3 from the encrypted packet. It then verifies the authenticity of Cert1 and extracts Server1's public key, which it then uses to verify the signature on the running_hash. If the signature was valid, then at this point Server 2 has authenticated Server 1. It then combines R1, R2 and R3 to create the master_secret. Finally, it sends a message to Server 1 encrypted with the master_secret. encrypt(Done, master_secret). On receiving this message Server 1 will attempt to decrypt it using the master_secret it independently computed in Step 3. If the decryption is correct then Server 1 has authenticated Server2.

Both parties have now authenticated each other and share a secret the master_secret, which they can use for further communication with each other.

What we have described is the handshake with mutual authentication which assumes both parties have certificates. Often one side, typically a user at a browser, will not have a certificate, but the other side, e.g. the USPTO web site, will have a certificate. In this case the web site will not request mutual authentication, and the browser will not sign the running_hash. Otherwise the rest of the protocol remains the same. While this has some value, the MITM protection only comes into play when mutual authentication is used. This is why phishing has been widespread in spite of SSL being deployed widely.

In the event that two entities have previously exchanged a master_secret, which they have retained, the protocol provides a way for them to resume communications over a new transport, using the existing parameters. In this "abbreviated handshake":

The first handshake message from the first entity to the second entity contains the SessionID of the previous session.

If the second entity is willing and able to resume the previous session, the reply contains the same SessionID, and a message encrypted with the previous master_secret.

If the first entity successfully decrypts the message then it in effect authenticates the second entity. It then responds with its own message encrypted with the master_secret. The second entity can decrypt this message thus authenticating the first entity.

This allows the two entities to resume the session without having to perform any operations involving public key cryptography (which is resource intensive).

MashSSL

MashSSL is a three entity mutual authentication and key exchange protocol based on the SSL protocol. It is fully described in a related application, "MASHSSL: A NOVEL MULTI PARTY AUTHENTICATION AND KEY EXCHANGE MECHANISM BASED ON SSL", and FIG. 2 shows an example comparison.

Delegated Authentication

It is often the case that a web service A may desire to provide a user with a service which requires data from a third party B. Several approaches abound to solve this problem:

The user can go to A, get the data, and then give it to B. This is obviously quite cumbersome.

The user can give away its credentials to access the data at B, to web service A. A then pretends to be the user and obtains the data. This obviously has the security weakness of the user having to give away their credential with B to A. It becomes a further problem as on-line credentials become stronger, and are inherently hard to 'give away'. e.g. if the credential is based on a smartcard or a biometric it literally cannot be given away.

The user can delegate a certain amount of authority to A to get data or take actions on its behalf at B. This is conceptually identical to how a 'power of attorney' works in the physical world. Our focus is on this type of delegated authentication in the on-line context.

There have been several schemes proposed along the lines of the third approach, with numerous variants. For instance, several schemes are based on the notion of Service A getting a 'claim' or 'ticket' with the cooperation of the user, which is then presented to Service B. Before describing our invention we will briefly describe three schemes currently in widespread use on the web. These three schemes can be thought of as representative of the large number of schemes of this nature.

Google Delegated Authentication for Web Applications

In the Google system there are four entities:

The User who wants to delegate privileges to a web application

The Web Application that wants to access a Google Service on behalf of the user

The Google Authentication system with which the User shares a credential

The Google Service which has the User's data

This is shown in FIG. 3 (which is reproduced from the Google web site describing the protocol) and describes the protocol flow.

The process proceeds as follows:

The User goes to the Web Application, which,

Redirects user's browser to Google authentication with a request for a token.

The User is asked to log in and grant permission.

If permission is granted the browser is redirected back to the web application with the token.

The application can now present the token to the Google Service,

Which responds with the data.

Google has two further concepts germane to this discussion:

Tokens may be 'secure' or not. Secure tokens are only granted to 'registered' applications.

The Web Application may be 'registered' (that is, it has been vetted before).

In Step 2 when the user gives permission to the Web Application, Google informs the User if the application is secure or not, and informs them whether it has been registered. Naturally, it is likely that the User will be far more inclined to grant permission to a 'secure and registered' application, versus, one which triggers a warning saying it is not secure and not registered. Further, each Google service can choose to only accept 'secure' and 'registered' Web Applications. Our focus consequently is on the 'registered' and 'secure token' process.

Any application provider can go through a process by which they get 'vetted' (prove control of their domain) by Google and become a registered web application. When they do this can 'register with enhanced security' for which they register a digital certificate with Google (the Web Application retains the private key). Any request for a secure token made by the Web Application henceforth must be digitally signed using the private key associated with that service.

Observations on Inefficiencies:

Multiple Authentications: Note that requests for tokens made by the web application are on a per user per service basis. This means that if a web application is serving a large number of users, then it needs to perform a digital signature for each request for each user, and Google will have to do the signature verification each time. As both operations require the use of public key cryptography (Google specifies the RSA algorithm at this time) these are expensive operations. It is instructive to note that Google has to do this because the access it is allowing is authorized by individual users. In other words, the web application is not authorized to access data on any user's behalf, each token ties a given user to the web application.

Multiple Security Protocols: While not obvious from the figure, Steps 1 through 4 are happening through the user's browser. Steps 5 and 6 are a direct web connection between the web application and Google. This latter connection, as it is requesting sensitive user data, is actually running over SSL. In other words, in addition to the digital signature overhead in the application protocol, there is additional SSL overhead (which again involves a number of public key operations).

Multiple Credentials: The Web Application need certificates for use with SSL, and additional certificates for use for registering and requesting secure tokens.

Credentialing Overhead: Google has to set up a registration process to verify the authenticity of web applications and the companies that host them. Notice however that for its SSL connection Google relies instead on a 3rd Party credentialing service (the certificate authority)

Lack of strong user control. While information is only shared by Google after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

Yahoo! Delegated Authentication (BBauth)

In the Yahoo! system the process flows as follows:

The Web Application does a one time registration with Yahoo! at which point it gets certain parameters, including a shared secret it will use to authenticate in future to Yahoo!.

The first time the Web Application needs to access Yahoo! on behalf of the User the User is redirected to Yahoo! as shown in the figure below, and a token is sent back by Yahoo! to the Web Application. The redirect includes a 'signature' created by the Web Application. It should be noted that this 'signature' is actually a hash that includes various values including the shared secret, and does not use digital certificates.

This token (which is valid for 14 days) is used by the Web Application to get temporary 'user credentials' which are valid for one hour.

The 'temporary user credentials' are in turn used to access the actual data on behalf of the user.

Observations on Inefficiencies

Multiple Authentications: The Web Application has to get tokens on a per user basis. Again, this is deemed necessary because the Web Application is not given carte blanche access, The inefficiency is in that the authentication of the Web Application itself is repeated each time for each user.

Multiple Security Protocols: When the request for data is actually made, it is done so over SSL. In other words all the cryptographic overhead of SSL is invoked in addition to the cryptography to authenticate and verify the tokens.

Multiple Credentials. The Web Application needs SSL credentials and distinct credentials from Yahoo!

Credentialing Overhead. Yahoo! has to set up a registration process to verify the authenticity of web applications and the companies that host them.

Lack of strong user control. While information is only shared by Yahoo! after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

Oauth: Delegated Authentication

Oauth (http://oauth.net) is a proposed standard for achieving more or less the same goals as the Google or Yahoo! protocols described earlier. It is derived from the above schemes and other schemes similar to them. In Oauth the entities are defined as:

User

Consumer (the web application which wants to GET data on behalf of the user)

Service Provider (the web service that has the user's data).

The OAuth process works as follows:

The Consumer registers with the Service Provider and obtains credentials which could be a shared secret or a digital certificate.

For each request, the:

Consumer contacts the Service Provider directly and obtains a "unauthorized request token'.

When the User accesses the Consumer, the User's browser is redirected to the Service Provider with the "unauthorized request token".

The user authenticates to the Service Provider, who then creates an 'authorized request token', which is sent back to the Consumer via the User's browser.

The Consumer exchanges the 'authorized request token' for an 'access token', which is used to retrieve the data.

The inefficiencies are very similar to those of the Google and Yahoo! systems.

Summary of Inefficiencies of Most Delegated Authentication Protocols

Multiple Authentications. The authentication cryptographic overhead is incurred for each user. Though the Service Provider and the Consumer might be communicating on behalf of hundreds of thousands of users, the cost of cryptographic processing is incurred for each user.

Multiple Security Protocols. The application level security protocols typically involve cryptographic overhead in addition to the cryptographic overhead used for the transport level SSL connections to retrieve data Multiple Credentials. The Consumer needs one set of credentials for the application security protocol (OAuth) and another set for the SSL connection.

Credentialing Overhead. The Service Provider (from whom data is accessed) has to credential all Consumers (the service accessing the data). Similarly Consumers may need credentials with multiple Service Providers. This is in addition to SSL credentials all parties have.

Lack of strong user control. While information is only shared by Yahoo! after the user gives permission, the permission choices have to be made in advance of data sharing and the user does not see the actual data being shared. While this may be tolerable in some cases, it is likely that in many cases, having the user explicitly view the data being transferred and explicitly authorizing the transfer is preferable.

Background on Cross Domain Authorization and Mashups

In the early years of the web, the role of the browser was largely limited to rendering the text and graphics that were downloaded from a web server. In more recent years web applications have increasingly grown richer in functionality. A lot of the richness comes from the use of scripting languages such as JavaScript and ActionScript, which allow a web site to send not just text and graphics to the browser, but actual programming code. The programming code can cause interactions with not just the web site from which it was downloaded, but also with other web sites. For instance in JavaScript using either the <SCRIPT> tag or the <IFRAME> functionality a web site could serve a page to a browser that loads pages from other web sites. For instance, the advertisements that are commonly seen on a web site are actually being loaded by the browser not from the web site it is ostensibly pointing too, but from different web sites. This raises security concerns, and the notion of a SAME ORIGIN POLICY was established wherein the browser is supposed to ensure that code downloaded from a given web site is only allowed to interact with that web site.

However, very soon a number of weaknesses were discovered giving rise to the attacks known as cross site scripting (XSS). For instance, code from a page from Site A on the browser could maliciously infect the page from Site B. Or a user be enticed via email or other means to visit a web site which had malicious code which would be directed at other web sites the user is visiting. Several approaches to solving the problem of XSS attacks have been proposed.

Meanwhile, the richness and interactivity of the web has taken a large step forward with the introduction of the XMLHttpRequest (XHR) functionality. A web site can send a web page to a browser containing XHRs which could establish communication back to the web site to exchange data. XHR is one of the fundamental components of AJAX which is a now a popular style of writing rich applications. However, the power of AJAX and similar technologies, also provides attackers with even more powerful ways of launching vastly more powerful XSS attacks.

To combat these attacks XHR itself is currently deployed with a Same Origin Policy enforced by the Browser. I.e. XHR downloaded from Site A cannot access resources on Site B, it can only communicate with Site A. Other desktop clients which work separately or in conjunction with browsers often follow similar policies. For instance Adobe's FLASH run time environment downloads an access control list at Site B to control whether a request present in code downloaded from Site A can access a resource from Site B. There is a proposal, that if implemented by browsers, would extend a similar concept to what the FLASH player does to the browser itself—namely allow cross domain accesses, i.e. code from Site A accessing resources at Site B as long as the browser can verify that Site B allows such accesses from Site A (by querying an access control list on Site B, before allowing the access).

We can categorize applications of this nature as 'mashups' namely when one Site is aggregating data for a User from one or more other sites. There are a few conceptual models of mashups which can be considered:

Server Side Mashing: Mashups where all processing happens server side. This is shown in FIG. 5. This can be easily done if there are no user credentials involved in the mashup, e.g. a coffee shop locater application that combines addresses of coffees shops with mapping web sites, to show the coffee shops on a map. Depending on the sort of application it may be convenient to do this on a Server, though in many cases it would be more advantageous to perform the mashup on the desktop itself When user credentials are involved, one approach is to ask the user for all the necessary credentials and then get the data on the user's behalf. Such 'account aggregation' sites have the disadvantage of requiring the user to give up their credentials, a problem that becomes even more acute as credentials become stronger and consequently harder (or impossible) to "give away"; how does one give away a copy of a smartcard? A third approach is to use delegated authentication where the User delegates authority to the masher site to access their data from other sites. This approach is discussed more comprehensively in a companion patent application (MashAUTH: Using MashSSL for Efficient Delegated Authentication).

Basic Desktop Mashing: As shown in FIG. 6, here Site A embeds code in its page that seeks to download information (or take action) on the user's behalf at Site B. If XHR allowed cross domain access, this would be a basic operation.

Extended Desktop Mashing: As shown in FIG. 7, here Site A embeds code in its page that seeks to download information (or take action) on the user's behalf at Site B, C, D and E. This is simply extending the notion discussed in basic mashups further to illustrate the point. If XHR allowed cross domain access, this would be readily possible.

Widget Based Mashing: As web applications get richer, more functionality happens locally in the User's browser (or other agent such as FLASH player, Google GEARS, etc.). This local functionality for which we use the term 'widgets', is rarely a stand alone application (though some are designed to function off-line), and is usually dependent on interaction with web sites. From a mashing perspective we can think of them conceptually as depicted in FIG. 8. Here we show one of the widgets as talking to the other widgets to pull together a mashup. The security problems of cross web site (or cross domain) authorization is in a sense abstracted away into the cross widget communication problem. Though, it can be observed that widgets running on a User's desktop are more likely to be compromised, than a properly maintained server. So even if Site X is viewed benignly, a widget from Site X might warrant more scrutiny.

HUB Based Mashing: Another conceptual model where the 'masher' first loads a 'hub' which loads widgets and enables their communication. This is shown in FIG. 9. There have been several proposals for such structures including MashUpOS (from Microsoft), SubSpace (from Stanford) and the OpenAJAX Hub specification. IBM recently made a security technology called SMASH a part of the OpenAJAX specification. The notion is that the hub will operate a number of "channels" to which widgets may be permitted to listen to, and/or, to broadcast to. A policy file (akin to an access control list) determines which widgets can listen/broadcast on which channels, which determines which other widgets they can communicate with. The proposal does not address the question of how the widgets and the sites behind them authenticate each other or share keys for encryption.

A web application can of-course combine aspects of these various mashup concepts.

The Mashup Security Problems of Relevance

There appears to be a general consensus that strictly enforcing a 'same origin policy' which clamps down on any cross domain communication of any sort (e.g. between a page from Site A to Site B, or between widgets, etc.), while good for security, needs to be 'relaxed' to permit the many different type of applications that mashups make possible. Doing so securely requires solving various problems which we enumerate:

SERVER AUTHENTICATION. When a browser retrieves a page from Site A, which wants to access a resource on Site B, we believe that it is imperative that Site B know for sure that the request originated from Site A. The notion that Site B will maintain a list of sites it trusts but will rely on the browser to determine if the request is coming from one of those sites, is very problematic. One can argue that since Site A is acting on the User's behalf, and it is relying on its User's credentials being presented, that this is tolerable. However, for any critical data (e.g. financial information or health records) it is almost imperative that Site B know that it is indeed talking to the real Site A and not to vulnerable browser. Pivoting the entire security model on the most vulnerable point, the browser, is fundamentally problematic.

USER AUTHENTICATION It is important that if Site B is providing a User's data to Site A, then Site B and Site A should know whether the User has been authenticated by the other site. In the best case all three parties should be mutually authenticated so that all parties know who is at the other end.

SCALABLE AUTHENTICATION. The most popular mashups will often involve sites which are very popular. For instance Site B might be frequently accessed by user's from a page loaded from Site A. For performance reasons it may be necessary to avoid all the cryptographic processing authentication can entail, for every instance of a mashup.

SCALABLE AND FLEXIBLE AUTHORIZATION. The notion of maintaining lists of sites allowed to access a resource at a site might work in some cases, but does not scale very well. For instance, a banking web site might be willing to share a resource with other banks. Does it maintain a list of every other bank? An airline site might allow travel agency sites to access a resource. Does it maintain a list of every travel agency and constantly update it?

SCALABLE TRUST INFRASTRUCTURE. Consider the travel agency—airline example. One solution would be for the airline to credential every travel agency it communicates with. Naturally every airline will need to do the same, and every hotel will need to credential travel agencies, as will car rental companies, and so on. Meanwhile the travel agency will have to maintain and manage a bevy of credentials for all the parties it communicates with. Such a mashup infrastructure is not scalable. The cost of credentialing must be amortized across all parties who rely on that credential.

KEY EXCHANGE FOR ENCRYPTION. In general, today encryption for mashups happens only at the transport level. So for example, in the communication path Site A <--> Widget A <--> Widget B<--> Site B, it is likely that the communications between Site A <--> Widget A, and Site B <--> Widget B happen over HTTPS (HTTP over SSL). However, none of the entities at the application level have any keys to encrypt data. A robust mashup infrastructure would have the option of secure key distribution so that the various entities can encrypt their communications to each other.

CODE VERIFICATION. If Widget B receives code it needs to execute from Site A via Widget A, how does it know that the code has not been tampered with en route. While code signatures which are digitally signed using a public key infrastructure are one solution, they might not be the most appropriate for the smaller snippets of code, some of which might be dynamically generated (raising the signing overhead).

There are certainly other security problems germane to a mashup infrastructure, but, to summarize, the problems of relevance to us are:

1. SERVER AND USER MUTUAL AUTHENTICATION
2. SCALABLE AUTHENTICATION
3. KEY EXCHANGE FOR ENCRYPTION AND CODE VERIFICATION
4. SCALABLE TRUST INFRASTRUCTURE THAT PROVIDES SCALABLE AND FLEXIBLE AUTHORIZATION

OBJECTIVES OF THE INVENTION

This invention has the following objectives:
Create a mashup security protocol that
    achieves mutual authentication of the user and sites involved in the mashup.
    securely distributes keys that can be used for encryption and code verification between all entities involved in the mashup.
    achieves an efficient way for sites who mutual authenticate to create a mashup for a user, to re-establish their mutual authentication when conducting a mashup for another user.
    reuses the only scalable trust infrastructure already extant on the Internet, namely the SSL digital certificate infrastructure that has been widely deployed (for authenticating sites/businesses; it has not been widely deployed for users)
Create this mashup security protocol without creating a need for entirely new cryptographic protocols, new software, new standards, new trust infrastructures (e.g. certificate authorities to issue certificates). In other words, create a protocol that can reuse as a building block a very widely available security standard, namely SSL.
Do so in a fashion that minimizes to the furthest extent possible the actual changes to SSL processing, so as to retain and inherit the security properties and benefits of ubiquitous deployment that SSL has. While it would be far easier to meet the goals by introducing many arbitrary changes and extensions, it is much harder, but necessary, to devise a scheme that has maximal impact with minimal changes.

Do so in a fashion where only sites require digital certificates, while users can have a less cumbersome credential while retaining much of the security of digital certificates. (though we do not preclude the third entity from also using a digital certificate)

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

Our first innovation is to propose a cross domain authentication and authorization protocol based on a SSL, which can be used by a browser or other desktop agent to determine whether a cross domain request should be allowed, and for the site on which the request is being performed to receive a token that convinces it that the request truly originates on behalf of a site it trusts without having to trust the browser or user agent.

Our second innovation is to use to the above protocol to distribute keys to all entities in the mashup chain, (for example, the Site A <--> Widget A <--> Widget B <--> Site B chain) such that any two of the entities can communicate privately even when the communication flows through one of the other entities.

Our third innovation is to show how the keys exchanged above can be used for ongoing authentication of the entities and for verification of authenticity of code and data they exchange.

Our fourth innovation is to extend this mutual authentication and key exchange to a 'hub mashup' model where one widget, the hub, acts as the core through which all inter widget communications flow.

Our fifth innovation is to extend all the above mechanisms to a scalable model where two sites who have previously authenticated each other in the course of authorizing a cross domain authorization (or in the course of setting up a mashup) on behalf on one user, can reuse parameters from this session when they have to perform a cross domain authorization (or set up a mashup) on behalf of a new user.

Our sixth innovation is to describe an extension to SSL certificates to make them applicable to mashup authentication and authorization, and to propose a management mechanism for the same.

BRIEF DESCRIPTION OF DRAWINGS

FIG. 10 describes the MashSSL-Handshake-1 message as used for cross domain authentication and authorization in accordance with the preferred embodiment of the present invention.

FIG. 11 describes the MashSSL-Handshake-2 message as used for cross domain authentication and authorization in accordance with the preferred embodiment of the present invention.

FIG. 12 describes the MashSSL-Handshake-3 message as used for cross domain authentication and authorization in accordance with the preferred embodiment of the present invention.

FIG. 13 describes the MashSSL-Handshake-4 message as used for cross domain authentication and authorization in accordance with the preferred embodiment of the present invention.

FIG. 14 describes the MashSSL-Handshake-2abbreviated message as used for cross domain authentication and authorization in accordance with the preferred embodiment of the present invention.

FIG. 15 describes the MashSSL-Handshake-3abbreviated message as used for cross domain authentication and authorization in accordance with the preferred embodiment of the present invention.

PREFERRED EMBODIMENT(S) OF THE INVENTION

Figure 1:
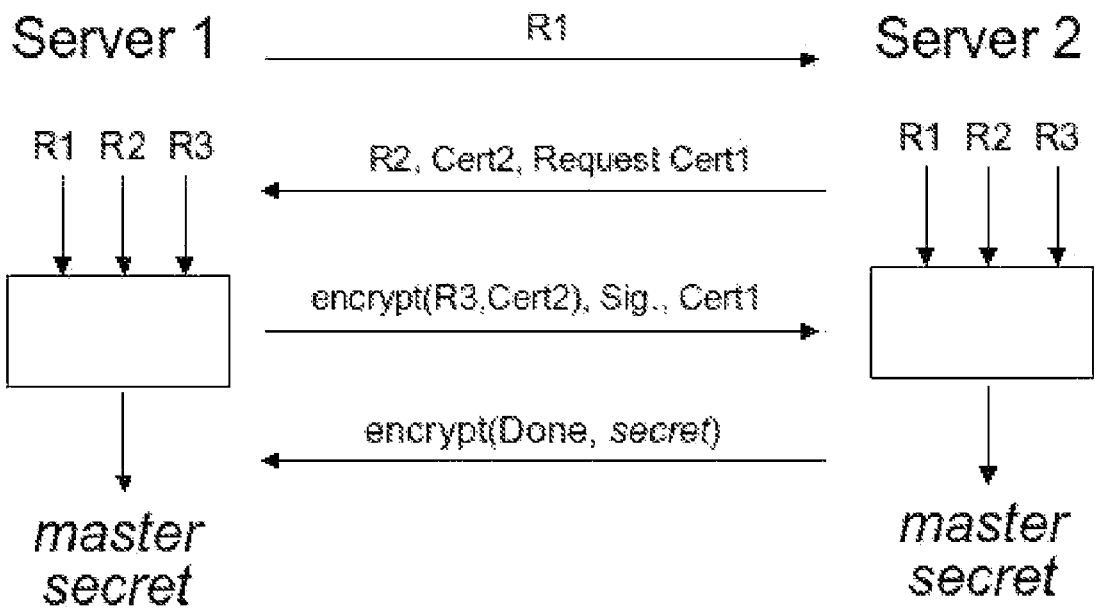
FIG. 1 depicts two servers conducting a standard SSL handshake.
Figure 2:
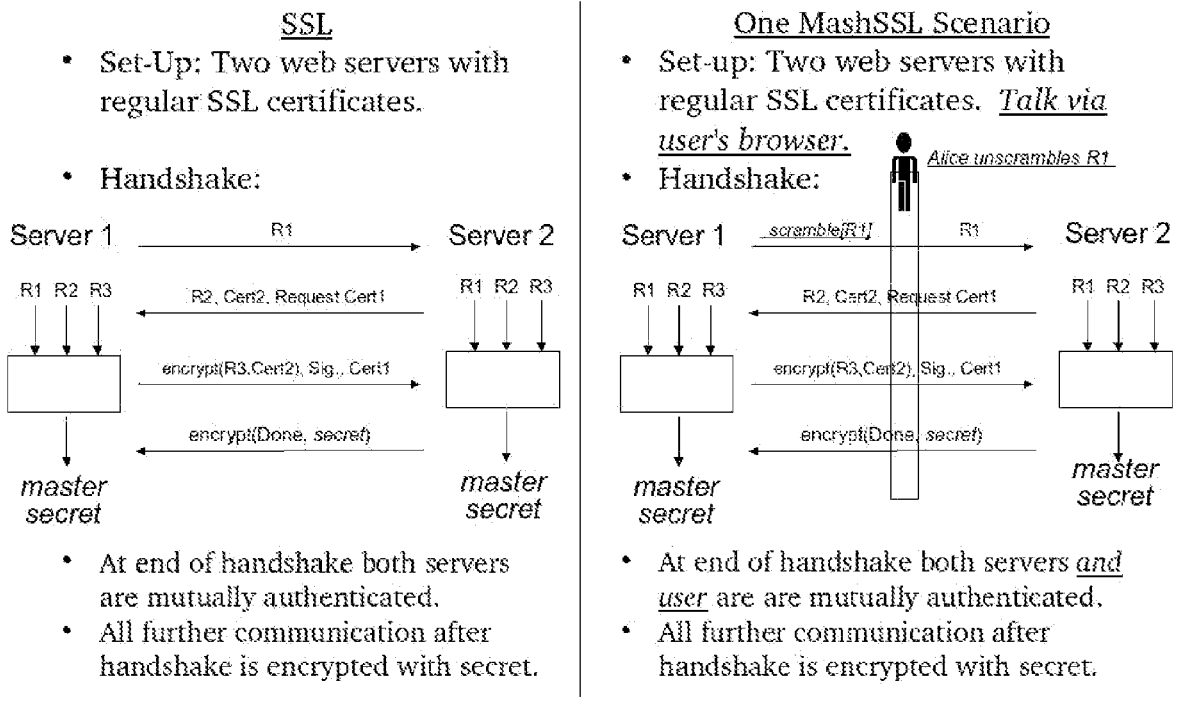
FIG. 2 depicts the comparison between servers conducting a SSL handshake versus servers conducting an example MashSSL handshake through a User.
Figure 3:
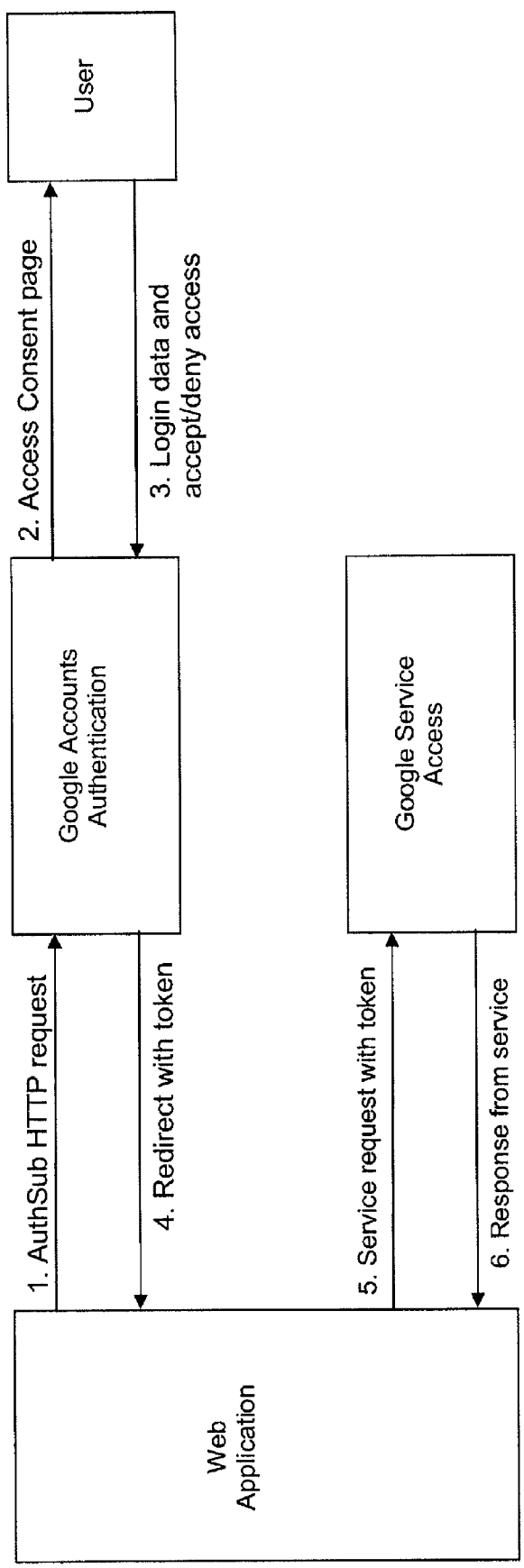
FIG. 3 is an example of a delegated authentication (reproduced from http://code.google.com/apis/accounts/docs/AuthForWebApps.html)
Figure 4:
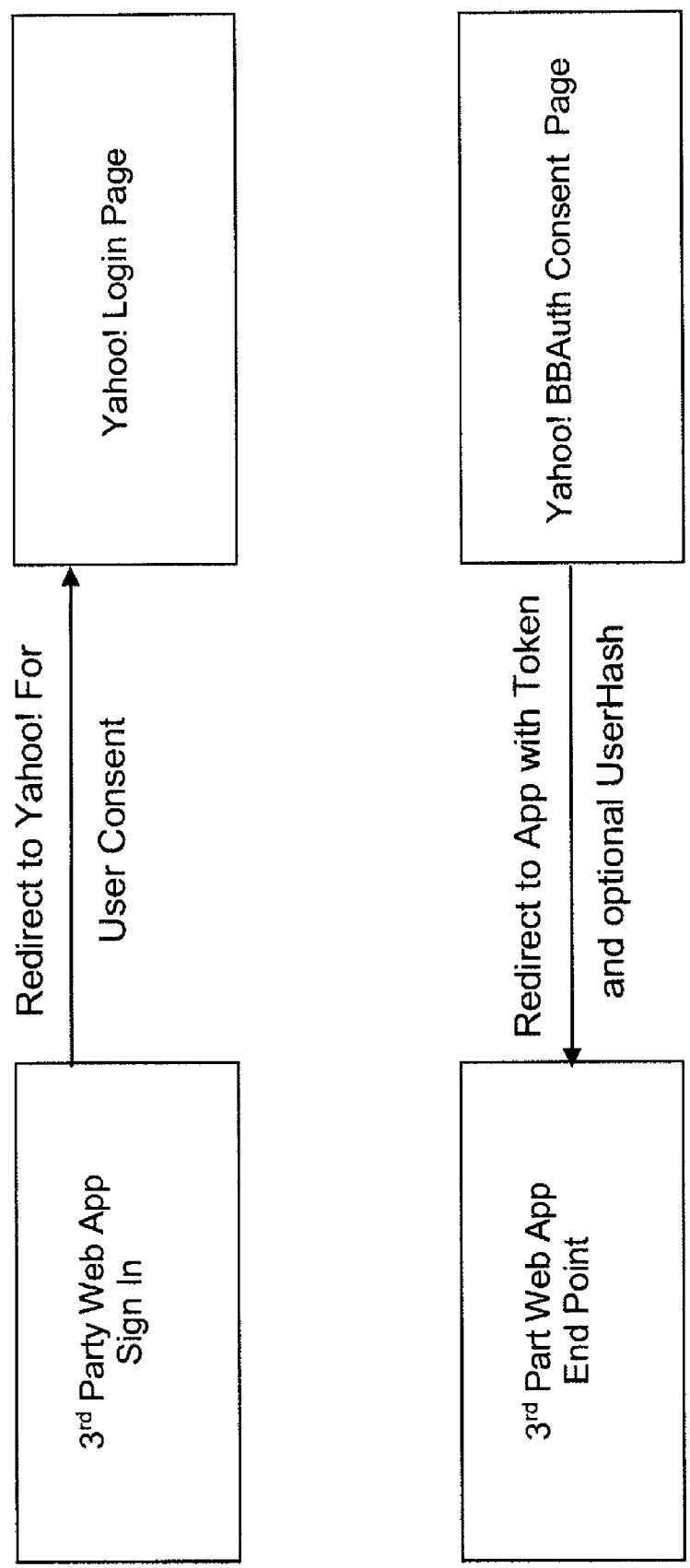
FIG. 4 is another example of a delegated authentication protocol (reproduced from http://develper.yahoo.com/auth/)
Figure 5:
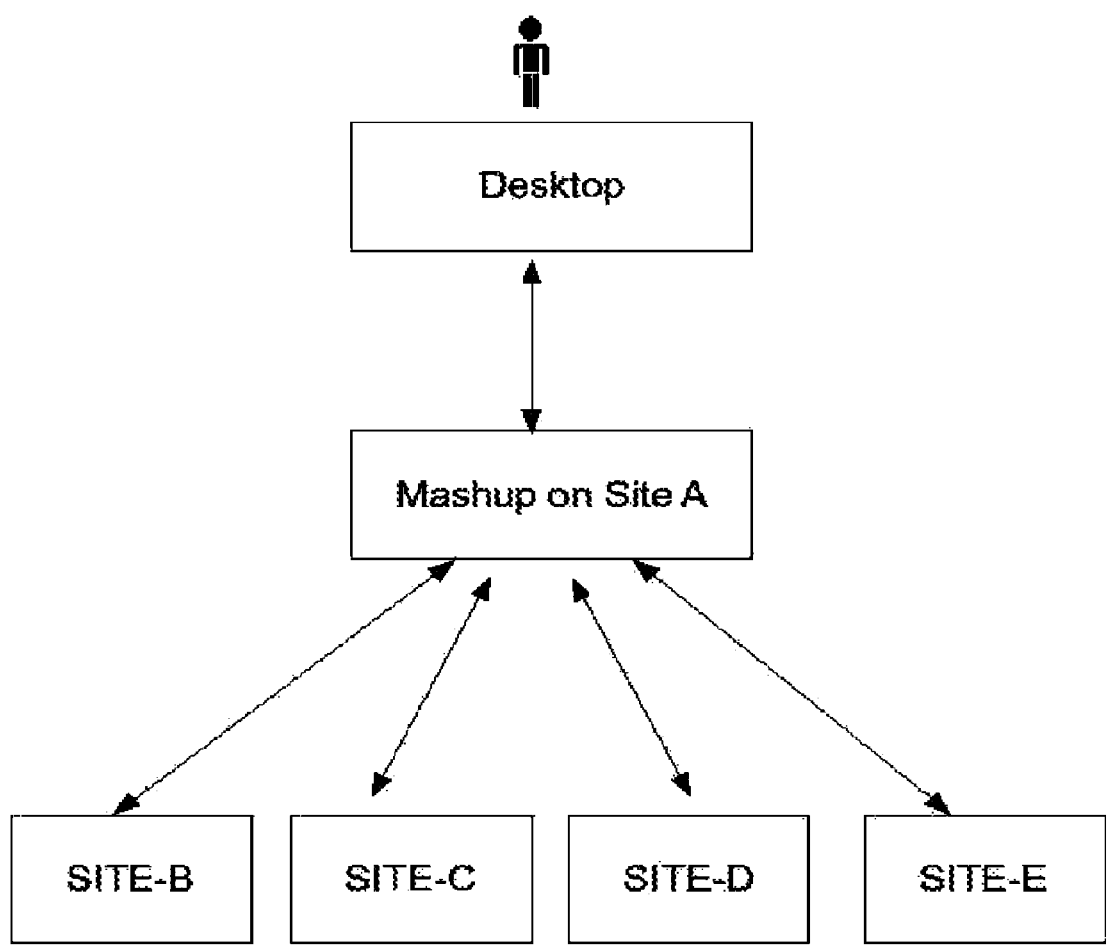
FIG. 5 depicts a conceptual overview of server side mashing.
Figure 6:
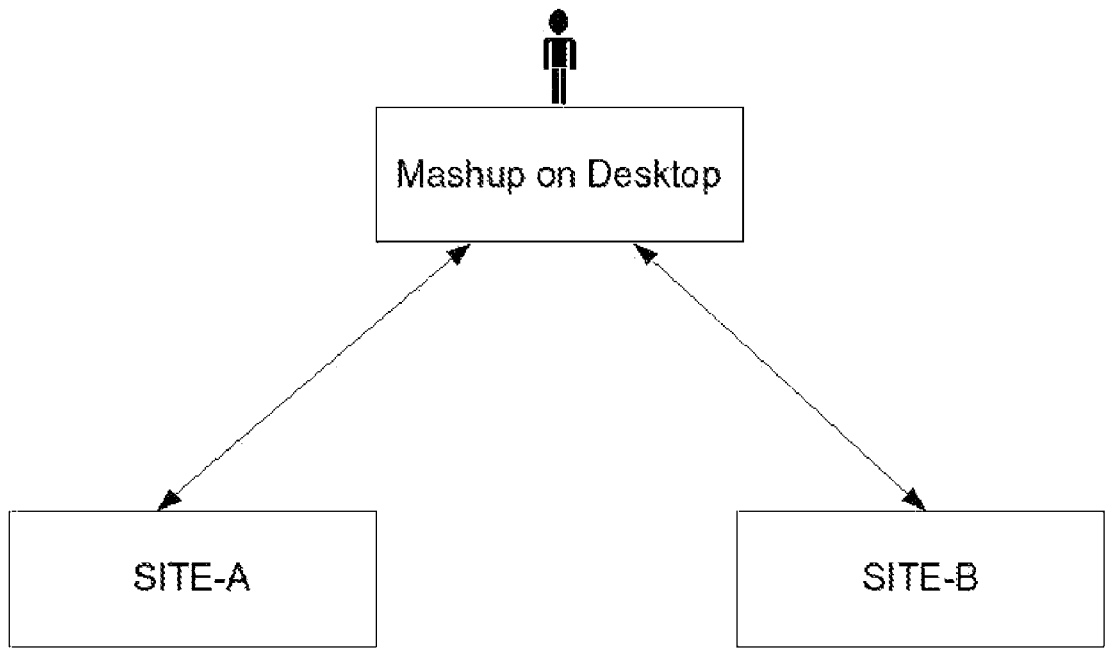
FIG. 6 depicts a conceptual overview of basic desktop based mashing.

We start by showing how cross domain authentication and authorization proceeds when a User at a Browser (henceforh the term browser should be understood to include a web browser or other desktop agent, e.g. a FLASH player), loads a page from Site A, which wants to access a resource at Site B. Please note that in keeping with SSL and MashSSL terminology, the words Client and Server are used in the messages. They refer in our preferred embodiment to Site A and Site B respectively. FIG. 6 shows the three entities, the User at a browser (or desktop agent) who has loaded a page from Site A which requests cross domain access to a resource on Site B. The browser sends a message to Site B causing it to initiate the MashSSL-Handshake-1 message (FIG. 11) to Site B via the browser. If necessary, Site A can scramble the message per the MashSSL specification, in order to authenticate the User. On receiving the message, Site B responds with the MashSSL-Handshake-2 message (FIG. 12) via the browser. If necessary Site B can scramble the message, per the MashSSL specification, in order to authenticate the User. SiteA now sends the MashSSL-Handshake-3 message (FIG. 13), to which Site B responds with the MashSSL-Handshake-4 message (FIG. 14). As shown in FIG. 14, this message From Site A to Site B includes the following:

<general-parameters>
<cross-domain-authorization-token>
<cross-domain-client-server-key>
<cross-domain-client -server_widget-key>
<cross-domain-client_widget-server-key>
<cross-domain-widget-widget-key>

Only Site B can decrypt this message as it is now in possession of the master-secret. To authorize cross domain authorization Site B simply provides the browser (or other desktop agent) the cross-domain-authorization-token. The browser can now submit it along with the cross domain request itself. Note that the number of times the token can be used from that user, or the length of time for which it can be used are all parameters that can be adjusted.

Figure 7:
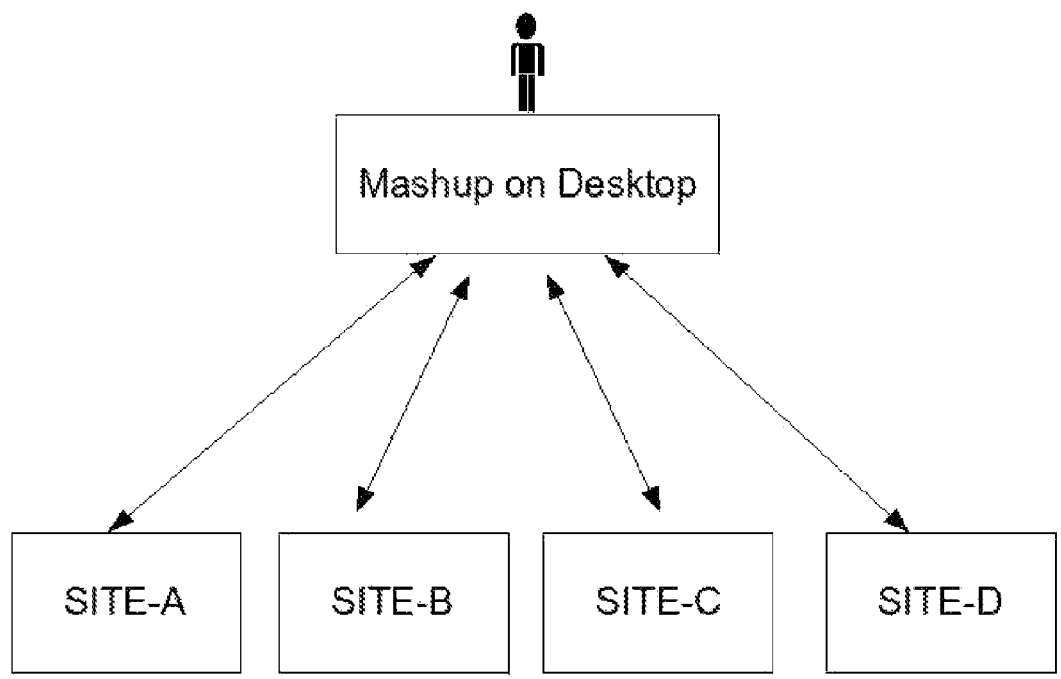
FIG. 7 depicts a conceptual overview of extended desktop based mashing.
Figure 8:
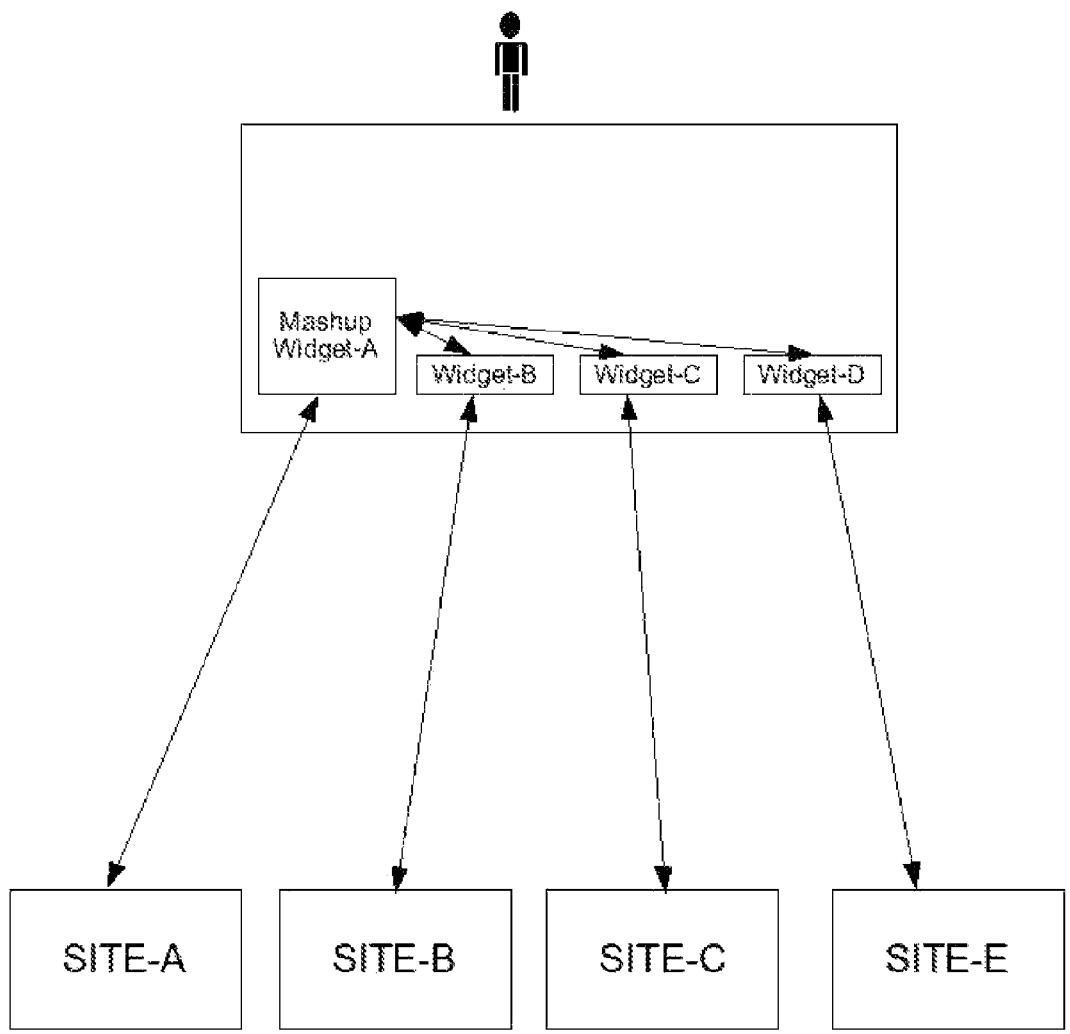
FIG. 8 depicts a conceptual overview of widget based mashing.
Figure 9:
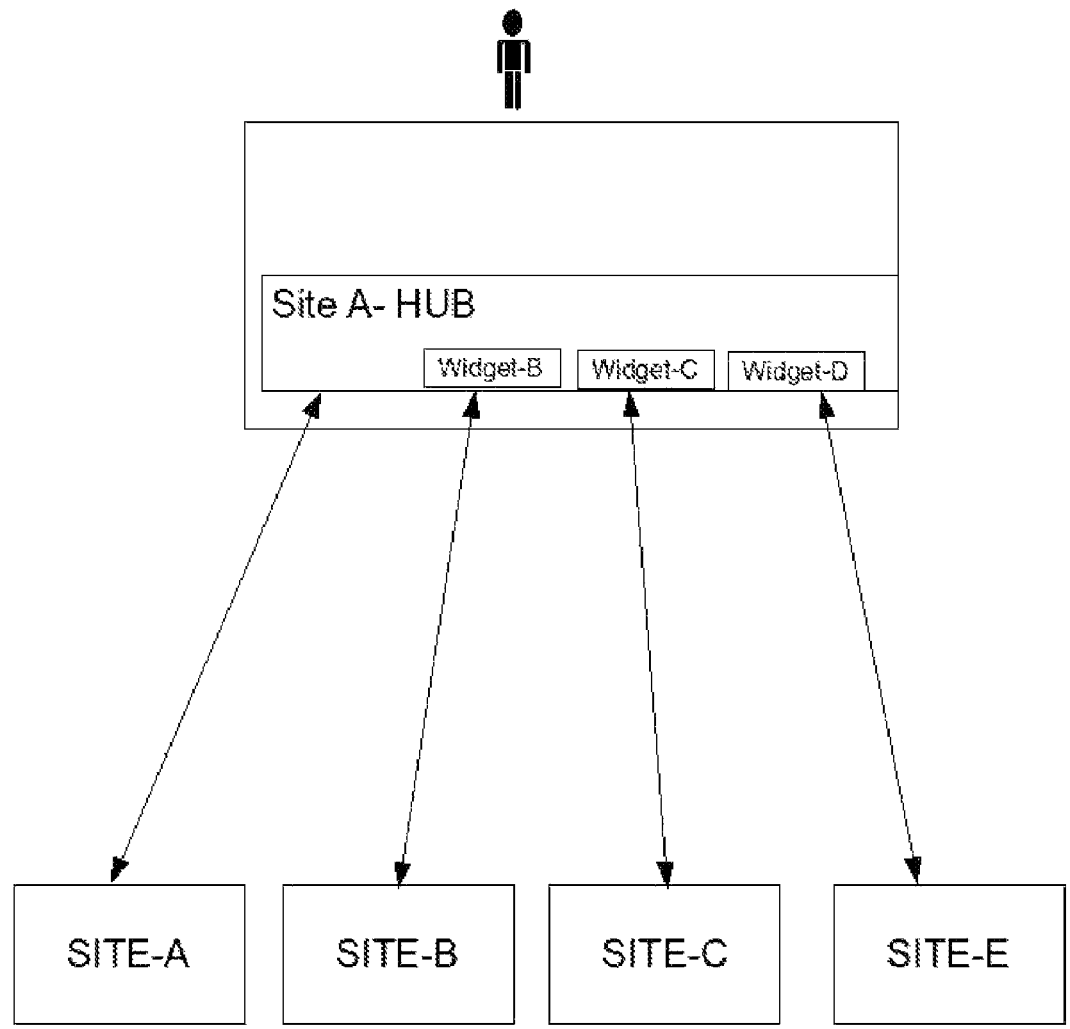
FIG. 9 depicts a conceptual overview of hub based mashing.

It could be the case that communication of the four messages proceeds along the Site A <--> Widget A <--> Widget B <--> Site B path shown in FIG. 7. In that case in the course of sending the MashSSL-Handshake-4 message, Site B will use the <mashssl-data-for-user> field to provide Widget B with two keys, one for it communicate with Widget A (<cross-domain-widget-widget-key>), and the other key with which Widget B can communicate to Site A (<cross-domain-client-server_widget-key>). After receiving the MashSSL-Handshake-4 message, Site A will give Widget A two keys, one for it to communicate with Widget B(<cross-domain-widget-widget-key>), and the other key with which Widget B can communicate to Site A(<cross-domain-client_widget-server-key>).

It may seem odd to have Widget A and Site B share a key that even Widget B does not see (in the chain Widget-A <--> Widget B <--> Site B). However, this allows this key to be used by Site B to cryptographically sign (by hashing or encryption) any code or data it is sending to Widget A. In this scenario even if Widget B is compromised, Widget A can be assured that it is not getting malicious information. The client-server-key can be used by Site A and Site B to communicate privately, and similarly the widget-widget-key can be used for Widget A and Widget B to communicate privately (or authenticate each other and sign code/data they exchange).

Note that instead of Site B sending the keys to Site A in the handshake message, it could also do so in a subsequent SSL application data message. Or if it is preferred, the keys could be generated and distributed by Site A to Site B, or each could generate some of the keys.

Note that Site A and Site B have now also established a long term master-secret which only they know. They can use these keys to reestablish communication if they are participating in a mashup with a different user. As popular sites may be involved in mashups on behalf of several users, this provides enormous improvements in efficiency. This proceeds as follows: When the browser (or other desktop agent) signals to Site A to commence the MashSSL session with Site B, Site A might realize that it already has a long term session open with Site B. It sends the MashSSL-Handshake-1 (FIG. 10) message with the SSL-Session-ID being the same as that previously established. In this case Site B will respond with the abbreviated handshake message shown in FIG. 14, which contains the various keys previously described. However, it will only proceed to use these keys if it gets back from Site A the abbreviated handshake message shown in FIG. 15.

In either case the keys established can be used for authentication, privacy and for code verification.

Extending the above model to the hub type mashup works as follows:
The Site HUB and Widget HUB establish connections with all other Widgets/Sites as described above. I.e. Establish:
Site Hub <--> Widget Hub <--> Widget A <--> Site A
Site Hub <--> Widget Hub <--> Widget B <--> Site B
Site Hub <--> Widget Hub <--> Widget C <--> Site C
and so on.
Once this is done the hub acts as the middleman in Widget to Widget communication. It shares a key with every other Widget and with every other Site. It can use these keys to:

Authenticate a widget or a site
Decrypt any material coming from a widget, and if necessary encrypt it with the key of the destination widget/site.
Use the key to verify the authenticity of the code.

Note that although we describe our preferred embodiment in terms of Site Hub and Widget Hub, once the hub has been loaded, one can conceive of all the operations we describe being conducted by the Widget-Hub itself.

Finally, everything we have described in our preferred embodiment can be achieved using standard SSL certificates. This has the huge advantage that the trust infrastructure is already in place for certificate authorities to issue certificates to sites after ensuring that they are a legitimate business. These SSL certificates tend to be tied to domains, and chain up to a few well known roots. we propose that:
  1. The MashSSL certificates be tied to named applications. A given business might want to use very different policies and root chains for different applications.
  2. The roots be established based on logical business grouping. For instance it might be more meaningful if a MashSSL certificate chained upto a root that said "this is a travel agency in good standing", as opposed to "this is a business that exists". This provides for scalable authorization policies.
  3. Finally a MashSSL certificate authority switch can be contemplated that can be used to dynamically manage how different applications establish membership in different logical groupings.

What is claimed is:
1. A method for a cross domain request to allow a first entity, the Masher, to establish at a second entity, the User, a secure mashup by obtaining information from, or taking actions at, a third entity, the Mashee; the method comprising:
configuring a processor to perform the steps of:
  (a) the Masher entity sending a first SSL Client-Hello handshake message, to the Mashee entity, via the User entity, wherein the Masher entity authenticates the User entity;
  (b) the Mashee entity replying by sending a second SSL Server-Hello handshake message to the Masher entity, via the User entity, wherein the Mashee entity authenticates the User entity;
  (c) the Masher entity replying by sending a third SSL Client-Key-Exchange handshake message to the Masher entity, via the User entity;
  (d) the Mashee entity replying by sending a fourth SSL Server-Finished handshake message, via the User entity;
  (e) the Masher entity and the Mashee entity agreeing on a master-secret not known to the User entity;
  (f) the Mashee entity and the Masher entity securely communicating further by exchanging SSL Application Data messages either via the User entity, or directly;
  (g) the Mashee entity sending the Masher a message including a cross-domain-authorization-token encrypted by said master secret, which includes information that scopes cross domain access privileges and a token validity time, in either the fourth SSL Server-Finished handshake message, via the User entity, or in a subsequent SSL Application-Data message;
  (h) the Masher entity sending the User entity the unencrypted cross-domain-authorization token;
  (i) the User entity sending the cross-domain-authorization-token to the Mashee; and,
  (j) the Mashee validating the cross-domain-authorization-token before processing the cross domain request to determine, based on an identity of said Masher entity, whether a request presented by said User entity can access a resource from said Mashee entity.

2. A method for allowing a first entity, the Masher, to establish at a second entity, the User, a secure mashup by obtaining information from, or taking actions at, a third entity, the Mashee, according to claim 1, wherein the User entity consists of two separate sub entities, the User-Masher-Widget and the User-Mashee-Widget, both which reside at the User, with communications described in claim 1 flowing back and forth along the path Masher to User-Masher-Widget to User-Mashee-Widget to Mashee.

3. A method for allowing a first entity, the Masher, to establish at a second entity, the User, a secure mashup by obtaining information from, or taking actions at, a third entity, the Mashee, according to claim 2, wherein the Masher generates and securely communicates to the Mashee various encryption keys meant for securing communications between the Masher and Mashee, the Masher and the User-Mashee-Widget, the Mashee and the User-Masher-Widget, and, the User-Masher-Widget and User-Mashee-Widget.

4. A method for allowing a first entity, the Masher, to establish at a second entity, the User, a secure mashup by obtaining information from, or taking actions at, a third entity, the Mashee, according to claim 3, wherein the Masher securely communicates to the Masher-Widget the keys it needs for secure communication with other entities.

5. A method for allowing a first entity, the Masher, to establish at a second entity, the User, a secure mashup by obtaining information from, or taking actions at, a third entity, the Mashee, according to claim 3, wherein the Mashee securely communicates to the Mashee-Widget the keys it needs for secure communication with other entities.

6. A method for allowing a first entity, the Masher, to establish at a second entity, the User, a secure mashup by obtaining information from, or taking actions at, a third entity, the Mashee, according to claim 3, wherein some of the various keys are generated by entities other than the Masher and securely communicated to the appropriate other entities.

7. A method for allowing a first entity, the Masher, to establish at a second entity, the User, a secure mashup by obtaining information from, or taking actions at, a third entity, the Mashee, according to claim 3, wherein the entities use the keys they obtain to authenticate themselves to other entities, to securely communicate with other entities, or to vouch for the authenticity of code or data they share with other entities.

8. A method for allowing a first entity, the Masher, to establish at a second entity, the User, a secure mashup by obtaining information from, or taking actions at, a third entity, the Mashee, according to claim 2, wherein the Masher entity, and the User-Masher-Widget, acts as a hub, and establish secure connections and exchanges various keys, with a series of mashees and user-mashee-widgets.

9. A method for allowing a first entity, the Masher, to establish at a second entity, the User, a secure mashup by obtaining information from, or taking actions at, a third entity, the Mashee, according to claim 8, wherein the User-Masher-Widget can perform all the described actions itself, with no reliance on the Masher.

10. A method for allowing a first entity, the Masher, to establish at a second entity, the User, a secure mashup by obtaining information from, or taking actions at, a third entity, the Mashee, according to claim 8, wherein any user-mashee-widget can use the appropriate key to authenticate itself, securely communicate with, and vouch for the authenticity of the code or data it sends to the hub, for eventual use by another user-mashee-widget.

11. A method for allowing a first entity, the Masher, to establish at a second entity, the User, a secure mashup by obtaining information from, or taking actions at, a third entity, the Mashee, according to claim 8, wherein the hub can authenticate itself, securely communicate with and vouch for the authenticity of the code or data it sends to another user-mashee-widget.

12. A method for allowing a first entity, the Masher, to establish at a second entity, the User, a secure mashup by obtaining information from, or taking actions at, a third entity, the Mashee, according to claim 8, wherein the hub can use the Mashee digital certificate to decide which other widgets a given User-Mashee-Widget can communicate with, and also determine the nature of the communications permitted.

13. A method for allowing a first entity, the Masher, to establish at a second entity, the User, a secure mashup by obtaining information from, or taking actions at, a third entity, the Mashee, according to claim 1, wherein the Masher entity and the Mashee entity agree to reuse the agreed to master-secret not known to the User entity, as a basis for re-establishment of similar communications on behalf of, and via, a different User entity.

14. A method for allowing a first entity, the Masher, to establish at a second entity, the User, a secure mashup by obtaining information from, or taking actions at, a third entity, the Mashee, according to claim 1, wherein the SSL certificates are extended to be application certificates tied to applications instead of domains.

15. A method for allowing a first entity, the Masher, to establish at a second entity, the User, a secure mashup by obtaining information from, or taking actions at, a third entity, the Mashee, according to claim 1, wherein the SSL certificates chain up to, root or intermediate-root certificates that are unique to a logical groups of entities.

16. A method for allowing a first entity, the Masher, to establish at a second entity, the User, a secure mashup by obtaining information from, or taking actions at, a third entity, the Mashee, according to claim 15, wherein a central switch manages the logical grouping of entities to allow for more dynamic management of said groups.

* * * * *